Dec. 28, 1965     O. DOEBELI     3,225,560
GENERATOR DEVICE FOR ABSORPTION REFRIGERATING MACHINES
Filed May 6, 1964
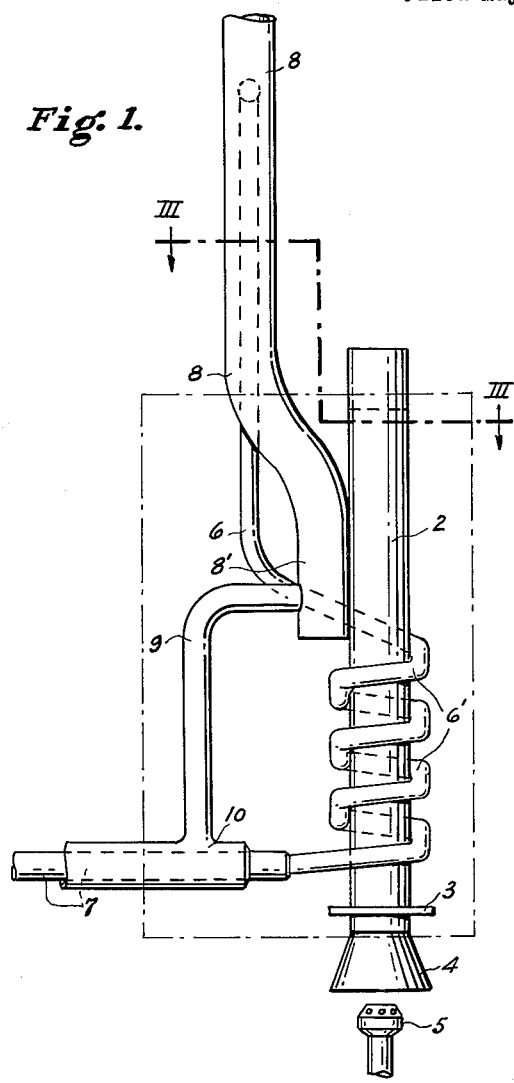
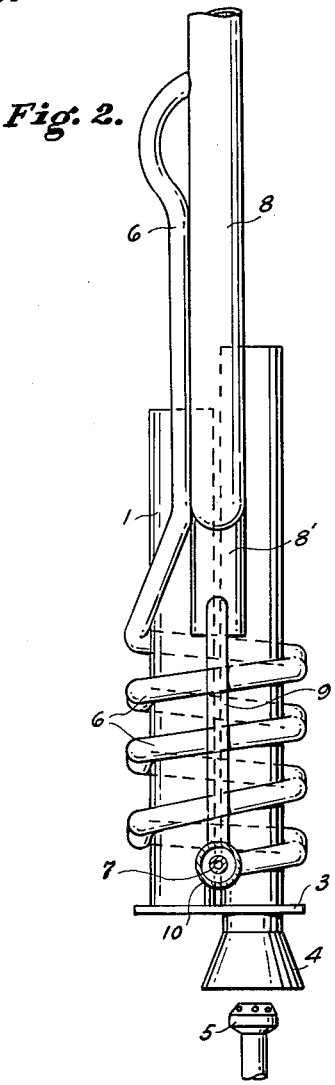
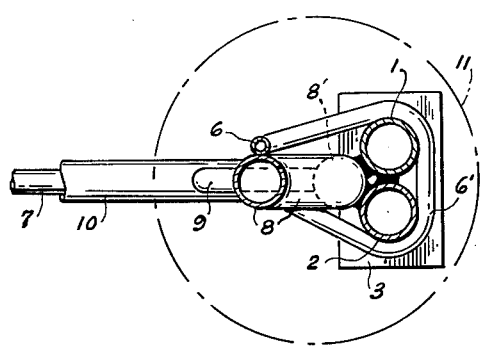
INVENTOR
OSCAR DOEBELI
BY
ATTORNEY

United States Patent Office 3,225,560
Patented Dec. 28, 1965

3,225,560
GENERATOR DEVICE FOR ABSORPTION
REFRIGERATING MACHINES
Oscar Doebeli, Fellenbergstrasse 239, Zurich, Switzerland
Filed May 6, 1964, Ser. No. 365,359
Claims priority, application Switzerland, Aug. 16, 1963,
10,142/63
3 Claims. (Cl. 62—236)

The present invention relates to a generator device for absorption refrigerating machines.

It is an object of the invention to provide a generator which can be heated selectively by means of an electric heating element or by a gas flame, the change-over from one method of heating to the other being attainable by a combination of an electric switch with a gas-cock, in such a way that when the heating current is switched on, the gas cock is closed, and vice versa.

One embodiment of a generator device according to the invention is illustrated in the drawing, where:

FIG. 1 shows a side view of the apparatus,

FIG. 2 is a side view turned through 90° with respect to the side view in FIG. 1, and FIG. 3 a section on the line 111—111 in FIG. 1.

The generator device has two vertically arranged heating pipes 1 and 2 which run parallel to each other and are connected by welding along a line with which they are in contact. The heating pipe 1 serves for receiving an electric heating element (not shown) and is open at the top, whilst the lower end is closed by a plate 3. The electric heating element is introduced into the heating pipe 1 from above.

The heating pipe 2 passes through a hole in the plate 3 and is open at both ends. A funnel-shaped part 4, widening downwards, is arranged at the lower end of the pipe 2, below the plate 3 and over a gas burner 5.

A pipe 6 of a gas-bubble pump passes in several turns 6' round the two heating pipes 1 and 2, to which it is connected thermally-conductingly by welding.

The lower end of the pump-pipe 6 is connected to the inner pipe 7 of a heat exchanger for fluids. The top end of the pump-pipe 6 leads into a pipe 8, into which the vapours driven out of the rich solution by the generator (the heating pipes 1 and 2) flow over together with the poor liquid carried with them. The portion 8' of the pipe 8 is thermally-conductingly connected to the upper ends of the two heating pipes 1 and 2. A pipe 9 connects the portion 8' with the space between the pipe 7 and the pipe 10 of the heat exchanger.

The two heating pipes 1 and 2, the portion 8' of the pipe 8, the pipe 10 and the windings of the pipe 6 are arranged entirely or for the greater part within the heat-insulating casing 11 (FIGS. 1 and 2).

Instead of several windings 6', there might be only one such winding.

The operation of the generator is the same as in known absorption refrigerating machines.

When one or the other of the heating pipes is heated by the electric heating element or by the burner 5 respectively, the gas is driven out of the rich liquid in the windings of the pump-pipe 6. The gas-bubbles forming in these windings pass upwards and enter the vapour pipe 8, 8', out of which they flow to the condenser (not shown) of the machine. The poor liquid carried along with them flows out of the lower end of the vapour-pipe 8, 8' into the pipe 9 and passes to the heat exchanger 7, 10 and from there to the absorber (not shown) of the machine.

The change-over from electric to gas heating is effected by means of a combination of gas cock and electric switch so that, when the electric heating element is switched off, the gas cock of the burner is automatically opened, and vice versa.

Because of the thermally-conducting connection of the heating pipes 1 and 2, these two pipes are always at a temperature which ensures that, when changing-over from one method of heating to the other, no interruption will occur in the working of the gas-bubble pump, and therefore none in the working of the machine.

What I claim is:

1. A generator device for absorption refrigerating machines comprising two heating pipes arranged vertically in immediately adjacent side-by-side relation and being welded together so as to be in thermal conducting contact with each other, one of said heating pipes having an electric heating element disposable therein, the other of said heating pipes being open ended and having a gas burner disposed below its lower open end, a pump-pipe of a gas-bubble pump having a helical portion made up of a plurality of turns extending around both of said heating pipes and being welded to the latter so that said turns of the pump-pipe are in thermal conducting contact with both heating pipes, and a pipe for the driven-off vapors and weak absorption liquids which has a thermal conducting connection with both of said heating pipes.

2. A generator device as in claim 1; wherein said pipe for the driven-off vapors and weak absorption liquids has a lower portion extending parallel to, and immediately adjacent to said heating pipes and being welded to the latter to constitute said thermal conducting connection with the heating pipes, and said pump-pipe opens into said pipe for the driven-off vapors and weak absorption liquids at a location above said lower portion of the latter pipe; and further comprising a return pipe extending from said lower portion of the pipe for driven-off vapors and weak absorption liquids and being adapted to conduct the latter to a heat exchanger.

3. A generator device as in claim 1; wherein said one heating pipe is closed at its lower end and open at its upper end to receive the electric heating element.

References Cited by the Examiner

UNITED STATES PATENTS

| | | | |
|---|---|---|---|
| 1,729,355 | 9/1929 | Munters | 62—497 |
| 2,363,771 | 11/1944 | Bergholm | 62—487 |
| 3,080,729 | 3/1963 | Grubb | 62—148 |
| 3,105,363 | 10/1963 | Von Der Scher | 62—148 |

ROBERT A. O'LEARY, *Primary Examiner.*